(12) United States Patent
Blandin et al.

(10) Patent No.: US 7,727,452 B2
(45) Date of Patent: Jun. 1, 2010

(54) PROCESS FOR CONTINUOUS CONSOLIDATION FOR OBTAINING A STRATIFIED MATERIAL AND DEVICE FOR ITS IMPLEMENTATION

(75) Inventors: Antoine Blandin, Chaudron-En-Mauges (FR); Philippe Du Chelas, Nantes (FR); Javier Iglesias, Madrid (ES); Christophe Menier, Saint Jean de Boiseau (FR); Eric Antoine, Reze (FR); Arnaud Gauffeny, Nantes (FR)

(73) Assignee: Airbus Operations SAS, Toulouse (FR)

( * ) Notice: Subject to any disclaimer, the term of this patent is extended or adjusted under 35 U.S.C. 154(b) by 367 days.

(21) Appl. No.: 11/602,191

(22) Filed: Nov. 21, 2006

(65) Prior Publication Data

US 2007/0113974 A1 May 24, 2007

(30) Foreign Application Priority Data

Nov. 24, 2005 (FR) .................................... 05 53586

(51) Int. Cl.
*H05B 6/02* (2006.01)
*B32B 37/04* (2006.01)
*B32B 37/06* (2006.01)
*B32B 38/08* (2006.01)

(52) U.S. Cl. .................... 264/480; 264/487; 264/171.13

(58) Field of Classification Search .............. 156/308.2, 156/309.6, 164, 309.3, 324; 264/486, 487, 264/166, 171.13, 479, 480
See application file for complete search history.

(56) References Cited

U.S. PATENT DOCUMENTS

| | | | |
|---|---|---|---|
| 2,442,443 A | 6/1948 | Swallow | |
| 4,296,514 A * | 10/1981 | Dokoupil et al. | 12/142 R |
| 4,543,145 A * | 9/1985 | Schnell et al. | 156/231 |
| 4,592,943 A | 6/1986 | Cancian et al. | |
| 4,609,423 A | 9/1986 | Zufang et al. | |
| 4,810,315 A * | 3/1989 | Zufang et al. | 156/84 |
| 4,826,555 A | 5/1989 | Long | 156/324 |
| 4,889,048 A * | 12/1989 | Miller | 100/313 |
| 5,057,175 A * | 10/1991 | Ashton | 156/202 |
| 5,445,701 A * | 8/1995 | Koba et al. | 156/441 |
| 5,484,500 A * | 1/1996 | Kaufmann et al. | 156/198 |
| 2005/0205568 A1 * | 9/2005 | Brown et al. | 219/759 |

FOREIGN PATENT DOCUMENTS

| | | |
|---|---|---|
| EP | 1016518 | 7/2000 |
| GB | 1452530 | 10/1976 |

\* cited by examiner

*Primary Examiner*—Joseph S Del Sole
*Assistant Examiner*—Ryan Ochylski
(74) *Attorney, Agent, or Firm*—Young & Thompson

(57) ABSTRACT

A process for continuous consolidation of at least one fold (22, 24), whereby the process includes unwinding a unit that consists of the at least one fold (22, 24) that is placed between two strips (26, 28) continuously along at least one curved path, the at least one fold (22, 24) being placed between guiding elements and a strip (26) to the right of the curved path to heat the at least one fold (22, 24) at least at the curved path and to exert tension on the strip (26) so that the latter compresses the at least one fold (22, 24) at least at the curved path, characterized in that it includes using strips (26, 28) whose width is greater than that of the at least one fold (22, 24) so as to be in contact on both sides of the at least one fold (22, 24).

6 Claims, 2 Drawing Sheets

PROCESS FOR CONTINUOUS CONSOLIDATION FOR OBTAINING A STRATIFIED MATERIAL AND DEVICE FOR ITS IMPLEMENTATION

FIELD OF THE INVENTION

This invention relates to a process for continuous consolidation for obtaining a stratified material as well as a device for the implementation of said process.

BACKGROUND OF THE INVENTION

For the production of external aircraft coverings, a skin that comprises a stratified material with a matrix made of resin that is reinforced by long fibers (of glass, Kevlar® or carbon, for example) is used. In flight, this covering is subjected to very strong air flows. Also, to prevent erosion phenomena, it is necessary that the covering surface that is in contact with the air does not comprise any porosity and has a glazed appearance.

According to an embodiment, this covering is obtained by continuously consolidating at least one material that consists of long fibers that may or may not be preimpregnated with thermoplastic resin (fabric or sheet of glass, Kevlar®, or carbon, for example) and at least one resin film that is placed against the fabric.

According to a first operating procedure, to carry out this operation, it would be possible to use a press that operates step by step. This press comprises two heating plates that apply pressure directly to the materials. According to this process, the finished product comprises juxtaposed zones that are consolidated successively. This technique that operates step by step is not satisfactory because the product is not homogeneous over its entire length, in particular at right angles with the junctions of zones that are consolidated successively, with, in particular, significant risks of defects of surface evenness and surface condition.

To remedy defects linked to the step-by-step operation, processes that allow a continuous consolidation have been developed.

According to another technique, the various folds to be consolidated are heated at a heating station then, in an offset manner, are laid against one another between rollers to obtain the consolidation. This operating mode is not satisfactory because the heating stage is offset over time relative to the pressing stage, which greatly impairs the quality of the product that is obtained. Furthermore, according to this technique, the surface condition is generally deplorable due in particular to the shearing phenomena of the resin, to the extent that the impression rollers are in direct contact with the product.

Finally, to the extent that the obtained product is continuously drawn at the end of the consolidation to ensure the movement of the folds through the various stations, the risk of the reinforcements of the woven folds becoming deformed is relatively high.

According to a recent technique, as illustrated in FIG. 1, the various folds and/or films 10 to be assembled are placed between two belts 12 in a loop, placed opposite one another, used to entrain said folds 10 in translation. A heating plate 14 is provided at each loop so as to apply pressure to the belts to lay the folds 10 against one another. Oil-filled compartments 16 are inserted between the belts 12 and the heating plates 14 to ensure the transfer of pressure and heat and to limit the friction between the belts 12 and the heating plates 14.

The belts 12 also ensure the unwinding of various folds and/or films that makes it possible to avoid the above-mentioned shearing phenomena.

This embodiment, however, is not satisfactory for the following reasons:

The costs of a piece of equipment for the implementation of this technique are relatively significant.

Furthermore, to the extent that the pressure that is necessary to continuously consolidate the folds is insignificant for developing an outside covering, this piece of equipment is oversized, which leads to generating relatively high operating costs.

In addition, the presence of oil compartments can produce oil leaks that can stain the material that is obtained and generate bonding problems in the downstream phases of use of this material.

Finally, during the implementation of this technique, it is possible to be confronted with difficulties of guiding the various folds that can create deformation problems of the reinforcements of the fabrics.

The document U.S. Pat. No. 2,442,443 describes a device for pressing and flattening a plastic sheet using two strips to unwind the sheet that is placed between them, whereby said strips and the plastic sheet unwind over a portion of the circumference of a drum, the strip placed outside at the drum having a tendency to exert pressure on said drum. Concomitantly, the heating means are provided at the drum.

This solution is not satisfactory for obtaining stratified products because it does not make it possible to obtain homogeneous temperatures on both sides of the product to be consolidated.

Also, this invention aims to remedy the drawbacks of the prior art by proposing a process for continuous consolidation that can be implemented simply and that makes it possible to obtain a product of quality that is as good or even better than the existing processes.

SUMMARY OF THE INVENTION

To this end, the invention has as its object a process for continuous consolidation of at least one fold, whereby said process consists in unwinding a unit that consists of said at least one fold that is placed between two strips continuously along at least one curved path, said at least one fold being placed between guiding means and a strip to the right of the curved path to heat said at least one fold at least at the curved path and to exert tension on said strip so that the latter compresses said at least one fold at least at said curved path, characterized in that it consists in using strips whose width is greater than that of said at least one fold so as to be in contact on both sides of said at least one fold.

The process of the invention makes it possible to obtain a quality consolidation thanks to a homogeneous temperature on both sides of the folds to be consolidated.

The invention also proposes a device for the implementation of the process according to the invention.

BRIEF DESCRIPTION OF THE DRAWINGS

Other characteristics and advantages will emerge from the following description of the invention, a description provided only by way of example, opposite the accompanying drawings in which.

DETAILED DESCRIPTION OF EMBODIMENTS

The process of this invention is now described for obtaining a stratified material 20 with a thermoplastic resin matrix that is reinforced by fibers, able to be used for the production of an outside aircraft covering. Of course, this process could be used for obtaining other stratified materials for other applications.

According to the selected example, the stratified material is obtained from a preimpregnated fabric 22, comprising woven glass fibers and two resin films 24 that are placed on both sides of the fabric 22.

By way of example, the fabric 22 is preimpregnated with thermoplastic resin. The resin film is a thermoplastic resin, in particular a phenylene polysulfide.

However, the material of the fibers of the fabric, the reinforcement and the resins could be different.

The process of the invention can be implemented for a single fold. It is then a preimpregnated composite material with enough resin so that the stratified material that is obtained is correctly consolidated.

The process of the invention can be implemented for a non-preimpregnated material, combined with a resin film.

In general, the process of the invention can be used to consolidate at least one preimpregnated fold or at least two folds, in particular a fabric and at least one resin film.

For the rest of the description, fold is defined as a film, a fabric, a non-woven material or the like.

Figure 1:
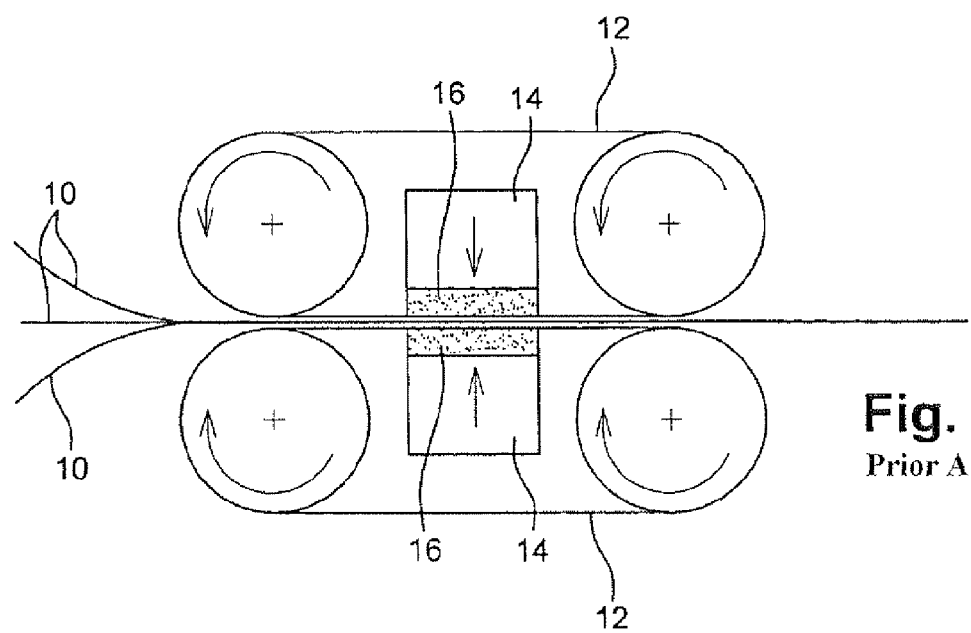
FIG. 1 is a diagram that illustrates a device of the prior art.
Figure 2:
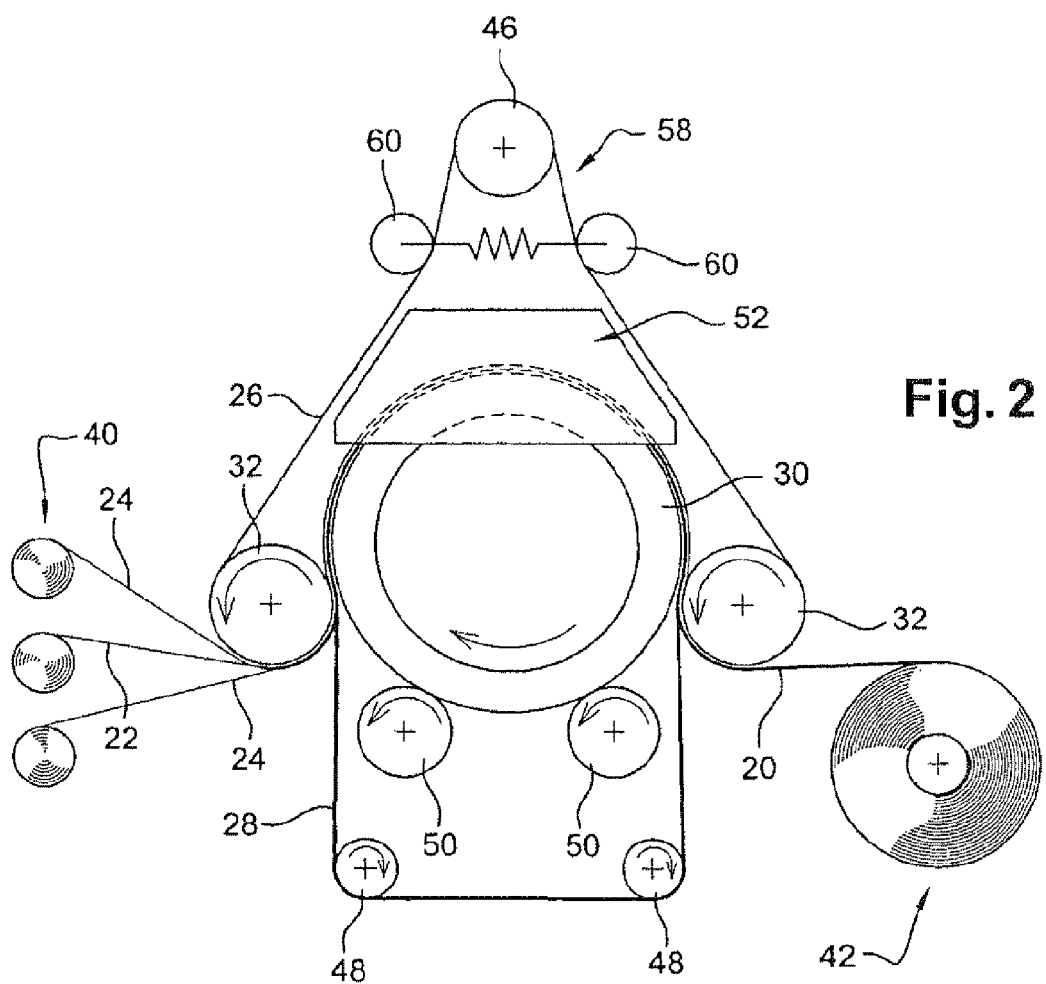
FIG. 2 is a diagram that illustrates a device for the implementation of the process according to the invention.

The product 20 that is obtained as well as the folds can be conditioned in the form of rollers, as illustrated in FIG. 2.

To ensure the continuous unwinding, at least one belt, called strip below, is used to entrain the various folds 22 and 24 at least at the continuous consolidation phase. The folds 22 and 24 are preferably inserted between two strips 26 and 28 or between one strip and one support surface.

To obtain a quality product, it is important that the different folds 22 and 24 be heated and pressed against one another concomitantly during the continuous consolidation.

Figure 3:
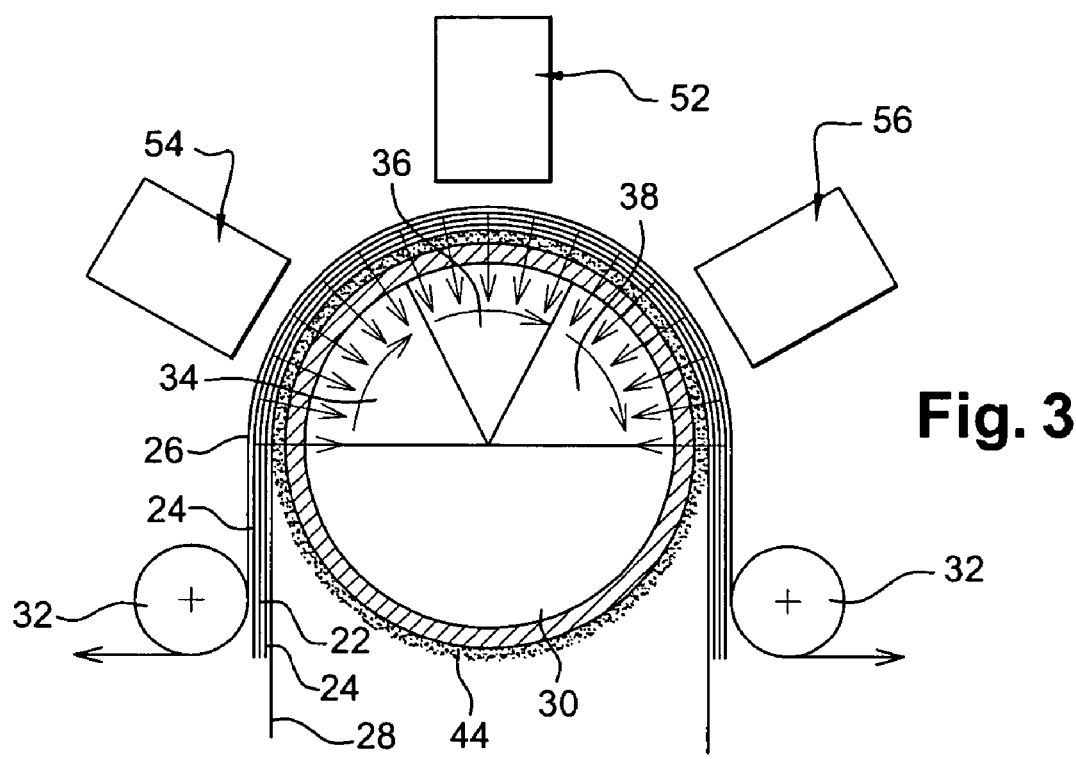
FIG. 3 is a diagram that illustrates in details the folds and the strips during the continuous consolidation.

According to the invention, the unit that consists of the folds and said at least one strip is continuously unwound by being guided by guiding means, for example rollers, arranged so as to define at least one curved path, the folds being placed between the guiding means and said at least one strip to the right of the curved path. To obtain the continuous consolidation, it is advisable to heat the folds at least at the curved path and to exert tension on said strip so that the latter compresses the folds at least at said curved path, as illustrated in FIG. 3.

The process of the invention also makes it possible to obtain a good homogeneity of the temperature and the pressure.

These characteristics make it possible to obtain a continuous quality consolidation.

To limit the shearing phenomena, the two strips or the strip and the support surface have the same linear speed at the contact surface with the folds.

It is possible to use two strips with identical roughness if the product that is obtained is to have two identical surfaces, without any pores, with a glazed appearance. Nevertheless if, for technical reasons (for better adhesion to the final support, for example), it is desired to obtain a different porosity between the two surfaces, it is possible to use two strips with different roughness levels. According to a simplified embodiment, it is possible to provide a single strip that is placed so as to come into contact with the surface with the glazed appearance.

According to another characteristic of the invention, the guiding means that make it possible to obtain at least one curved path comprise at least one drum 30 that is placed between two guide rollers 32, the unit consisting of folds and a strip or strips that unwind(s) between each guide roller 32 and the drum 30, whereby said drum has a suitable diameter that is based on the unwinding speed, compression time and heating time that are necessary.

This configuration makes it possible to obtain a relatively simple device that is less costly than the existing devices, better adapted, which makes it possible to reduce operating costs. In addition, to the extent that the folds are entrained with two strips that are placed on both sides of the folds, this arrangement makes it possible to obtain excellent guiding of the various folds that makes it possible to limit the risk of the fabrics becoming deformed.

According to another characteristic of the invention, the folds undergo a heat cycle at the curved path, whereby said cycle comprises a first phase of temperature increase, referenced 34 in FIG. 3, making it possible to reach the continuous consolidation temperature, a phase of holding the continuous consolidation temperature, referenced 36, during which the folds are compressed, and a cooling phase, referenced 38, during which the folds are compressed until the materials solidify.

During the temperature increase phase, the resin passes into a pasty phase and sticks to the fabric. During the phase in which the temperature is maintained, the resin liquefies, impregnating the fabric at the core.

The pressure is to be maintained as long as the temperature has not dropped below a threshold based on the assembled materials and the solidification of the resin that is used. Thus, the stratified material has good qualities of porosity and stabilized geometry.

According to an important characteristic of the invention, the strips 26 and 28 have a width that is greater than those of folds 22 and 24 to be in contact on both sides of the folds so as to obtain a heat conduction between the two larger strips and homogeneous temperatures on each face of the product.

In FIG. 2, an embodiment of a device for the implementation of the process of the invention is shown.

In terms of the unwinding of the product, this device comprises means 40 for continuously supplying folds to be consolidated, means for continuous consolidation, and means 42 for storing the product that is obtained. Optionally, control means can be inserted between the means for continuous consolidation and the storage means.

According to the embodiment illustrated in FIG. 2, the folds are preferably stored wound on rollers at supply means 40. Supply means 40 then comprise reels, the number of which is based on the number of folds to be consolidated continuously. This portion of the device is not described in more detail because it is within the grasp of one skilled in the art.

Downstream, the product that is obtained by the process of the invention is stored in the form of a roller at storage means 42. As above, this portion of the device is not described in more detail because it is within the grasp of one skilled in the art.

According to an embodiment, the means for continuous consolidation comprise a drum 30 and guide rollers 32 that are placed so as to produce a curved path for the unit that consists of the folds 22, 24 and the strips 26 and 28.

The strip 26 that is placed outside at the drum 30, called upper strip, is able to compress the folds against said drum 30 and to ensure the entrainment of the folds.

The strip 28 that is placed between the folds and the drum, called lower strip, is used to protect the product that is made from possible geometric imperfections of the drum 30.

The strips are to have a flawless surface condition to obtain a finished product with a glazed appearance.

Products such as cleaners, fillers, or demolding means can be coated on the surface of strips in contact with the product to limit the appearance of defects and to improve the surface condition.

According to an embodiment, the strips are metallic (copper, steel, titanium, etc.), which makes it possible to obtain a good compromise between the mechanical constraints, heat stresses and the constraints that are linked to the surface condition. The upper strip 26 is sized to transfer the pressure. In this regard, it is preferably thicker than the lower strip whose participation in the transfer of the pressure is much weaker. Nevertheless, its thickness should not be too significant since it would then be too rigid, and the roller 32 would have difficulties in making the upper strip 26 unwind.

According to the variants, the strips can come in continuous form, in a loop, as illustrated in FIG. 2, or in the form, each of them, of two coils placed upstream and downstream from the continuous consolidation zone.

In the case of strips in a loop, according to an embodiment illustrated in FIG. 2, the device comprises at least one upper roller 46 that makes it possible for the upper strip 26 to make a loop and at least one lower roller 48 that makes it possible for the lower strip 28 to make a loop.

To ensure the movement of unwinding at least one strip, in particular the upper strip 26, it is possible to use at least one guide roller 32 that is driven in rotation by any suitable means.

To limit the stresses on the strips due to winding, the guide rollers preferably have an adequate diameter linked to the thickness of the strips, to the diameters of the drum 30 and rollers 32.

According to the variants, the drum 30 can integrate the heating means that optionally are able to produce a heat cycle with a temperature increase phase, a phase of holding the temperature, and a cooling phase. Thus, the heat transfer is carried out by conduction from the lower strip to the upper strip.

According to the embodiment illustrated in FIG. 3, the drum 30 comprises at the surface an insulating coating 44 that makes it possible to obtain a homogeneous temperature at the folds during the continuous consolidation.

According to an embodiment illustrated in FIG. 2, the drum comprises guiding means that come in the form of two pairs of rollers 50 or the like, whereby each pair is placed symmetrically on both sides of the vertical median plane of the drum 30. As a variant, the rollers 32 can be used to support and to guide the drum 30 by selecting a suitable distance between centers.

According to another embodiment, the device comprises heating means 52 that are preferably placed to the right of or upstream from the portion of the drum 30 at the top.

In some cases, in particular during the consolidation of high-performance thermoplastics, it is necessary to provide high heating temperatures on the order of 400° C. and to transmit a high temperature gradient in a very short time so as not to decrease the pace of the consolidation. It is the same for the cooling. To solve this problem, means for heating by induction that will allow a rapid increase and decrease in temperature very close to the product are used.

In addition, it is possible to provide preheating means 54 upstream.

To avoid heat losses, the unit can be placed in a heat-insulated container.

The device preferably comprises cooling means 56 that make it possible to lower the temperature of the product below a certain threshold. According to a variant, the cooling is obtained by a stream of cold air.

To ensure the compression of the folds, the device comprises means 58 for tensioning the upper strip 26 comprising at least one tensioning roller 60 that can exert pressure against the upper strip 26. Advantageously, the device comprises adjusting means making it possible to adjust the pressure of the tensioning roller(s) on the strip and in this way the pressure exerted by the strip on the folds.

According to an embodiment illustrated in FIG. 2, the upper strip 26 makes a loop thanks to an upper roller 46 placed above the drum 30, preferably equidistant from the guide rollers 32. In this case, the means 58 for tensioning comprise two tensioning rollers 60 that tend to draw together the portions of the strip that are placed on both sides of the upper roller 46. Advantageously, it is possible to adjust the distance between centers of the tensioning rollers 60 so as to adjust the pressure that is exerted by the upper strip 26 on the folds. As a variant, the tensioning rollers are connected by a deformable element in an elastic manner whose stiffness can be adjusted to as to adjust the pressure exerted by the upper strip 26 on the folds.

As a variant, it would be possible to use the rollers 32 to adjust the tension on the upper strip 26, for example by adjusting the spacing between at least one roller 32 and the upper roller 46.

Of course, the invention obviously is not limited to the embodiment shown and described above, but on the contrary it covers all the variants, in particular concerning the heating means, the shape, the dimensions and the nature of the various elements.

Finally, the process of the invention can be used to consolidate continuously at least one fold regardless of the application of the product that is obtained.

The invention claimed is:

1. A process for continuous consolidation of at least one fold, said process comprising:

unwinding a unit that consists of said at least one fold that is placed between two strips continuously along at least one curved path, said at least one fold being placed between guiding means and one of said two strips that is adjacent to the curved path to heat said at least one fold, at least at the curved path and to exert tension on said one strip so that the one strip compresses said at least one fold at least at said curved path; and using said two strips each having a width greater than that of said at least one fold, said width of said two strips is so that said two strips are in contact with each other on both sides of said at least one fold, said two strips being metallic, said guiding means comprising a drum, one of said two strips being in contact with said drum, said one of said two strips being in contact with said drum having a thickness smaller than a thickness of another one of said two strips, in order to obtain heat conduction between the two strips, to obtain homogenous temperatures on each face of said at least one fold and to get an optimized heat transfer from said drum to said one of said two strips and from said one of said two strips to said another one of said two strips.

2. The process for continuous consolidation according to claim 1, wherein said at least one fold is heated by induction.

3. The process for continuous consolidation according to claim 1, wherein the two strips have the same linear speed at the contact surface with said at least one fold.

4. The process for continuous consolidation according to claim 1, wherein a pressure that makes it possible to compress said at least one fold is maintained as long as the temperature does not drop below a threshold that is based on the temperature of solidification of the materials to be consolidated.

5. The process for continuous consolidation according to claim 4, wherein said at least one fold undergoes a heat cycle at the curved path, whereby said cycle comprises a first phase of temperature increase making it possible to attain the continuous consolidation temperature, a phase of holding the continuous consolidation temperature during which said at least one fold is compressed and a cooling phase during which said at least one fold is compressed.

6. The process for continuous consolidation according to claim 2, wherein the two strips have the same linear speed at the contact surface with said at least one fold.

* * * * *